(12) United States Patent
Kuyel

(10) Patent No.: US 12,175,074 B2
(45) Date of Patent: Dec. 24, 2024

(54) HARDWARE ACCELERATED DATABASE SORTING IN SOLID STATE STORAGE DRIVES

(71) Applicant: SK hynix Inc., Gyeonggi-do (KR)

(72) Inventor: Andrey Kuyel, Minsk (BY)

(73) Assignee: SK hynix Inc., Gyeonggi-do (KR)

( * ) Notice: Subject to any disclaimer, the term of this patent is extended or adjusted under 35 U.S.C. 154(b) by 156 days.

(21) Appl. No.: 17/744,947

(22) Filed: May 16, 2022

(65) Prior Publication Data
US 2023/0367476 A1     Nov. 16, 2023

(51) Int. Cl.
*G06F 3/06*     (2006.01)
(52) U.S. Cl.
CPC .......... *G06F 3/0607* (2013.01); *G06F 3/0656* (2013.01); *G06F 3/0659* (2013.01); *G06F 3/0679* (2013.01)
(58) Field of Classification Search
CPC .... G06F 3/0604; G06F 3/0607; G06F 3/0629; G06F 3/0638; G06F 3/0656; G06F 3/0659; G06F 3/0671; G06F 3/0679
See application file for complete search history.

(56) References Cited

U.S. PATENT DOCUMENTS

| | | | |
|---|---|---|---|
| 9,727,308 B2 | 8/2017 | Boh et al. | |
| 2015/0227316 A1* | 8/2015 | Warfield | G06F 3/0688 711/162 |
| 2017/0277432 A1* | 9/2017 | Yun | G06F 3/0659 |
| 2019/0317727 A1* | 10/2019 | Antonopoulos | G06F 3/0604 |
| 2020/0081642 A1* | 3/2020 | Brown | G06F 11/1446 |

* cited by examiner

*Primary Examiner* — Ernest Unelus
(74) *Attorney, Agent, or Firm* — IP & T GROUP LLP

(57) ABSTRACT

A system and associated method for a storage device. In the system and method, a sort command from a host is received. In response to having received the sort command, the storage device is configured for sorting by allocating at least one storage location to store data to be sorted based at least on a) an amount of the data to be sorted and b) an available storage space in a memory of the storage device. In the system and method, an upgradable sorting algorithm is utilized to generate sorted data subsets, and the sorted serialized data subsets are stored based on the at least one storage location indicating where the data to be sorted is to be stored. Page identifiers (IDs) of the sorted data subsets are provided to the host.

21 Claims, 14 Drawing Sheets

FIG. 7

| Column 0 | Column 1 | | Column ε | Auxiliary metadata | |
|---|---|---|---|---|---|
| Record 0, field 0 | Record 0, field 1 | ...... | Record 0, field ε | Record 0, offset within the page | NAND page ID on which record 0 located |
| Record 1, field 0 | Record 1, field 1 | ...... | Record 1, field ε | Record 1, offset within the page | NAND page ID on which record 1 located |
| | | ...... | | | |
| Record k, field 0 | Record k, field 1 | ...... | Record k, field ε | Record k, offset within the page | NAND page ID on which record k located |
| | | ...... | | | |
| Record n, field 0 | Record n, field 1 | ...... | Record n, field ε | Record n, offset within the page | NAND page ID on which record n located |

Where:
  n-total number of columns (attributes) in sorted database table.
  $0 \leq \varepsilon \leq N$
  n-total number of records in sorted database table.
  $0 \leq k \leq n$

FIG. 8

Sorted dataset

| Column 0 | Column 1 | | Column ε | | Column n |
|---|---|---|---|---|---|
| Record 0, field 0 | Record 0, field 1 | ...... | Record 0, field ε | ...... | Record 0, field n |
| Record 1, field 0 | Record 1, field 1 | ...... | Record 1, field ε | ...... | Record 1, field n |
| | | ...... | | ...... | |
| Record k, field 0 | Record k, field 1 | ...... | Record k, field ε | ...... | Record k, field n |
| | | ...... | | ...... | |
| Record n, field 0 | Record n, field 1 | ...... | Record n, field ε | ...... | Record n, field n |

Where:
   n-total number of columns (attributes) in sorted database table.
   $0 \leq \varepsilon \leq N$
   n-total number of records in sorted database table.
   $0 \leq k \leq n$ Sorted dataset reduced into colmns by which dataset should be ordered, accompanied with auxiliary metadata.

| Column 0 | Column ε | Auxiliary metadata | |
|---|---|---|---|
| Record 0, field 0 | Record 0, field ε | Record 0, offset within the page | NAND page ID on which record 0 located |
| Record 1, field 0 | Record 1, field ε | Record 1, offset within the page | NAND page ID on which record 1 located |
| ...... | ...... | ...... | ...... |
| Record k, field 0 | Record k, field ε | Record k, offset within the page | NAND page ID on which record k located |
| ...... | ...... | ...... | ...... |
| Record n, field 0 | Record n, field ε | Record n, offset within the page | NAND page ID on which record n located |

Where:
   n-total number of columns (attributes) in sorted database table.
   $0 \leq \varepsilon \leq N$
   n-total number of records in sorted database table.
   $0 \leq k \leq n$

HARDWARE ACCELERATED DATABASE SORTING IN SOLID STATE STORAGE DRIVES

BACKGROUND

1. Field

Embodiments of the present disclosure relate to a platform for sorting data in solid state storage drives (SSD).

2. Description of the Related Art

The computer environment paradigm has shifted to ubiquitous computing systems that can be used anytime and anywhere. As a result, the use of portable electronic devices such as mobile phones, digital cameras, and notebook computers has rapidly increased. These portable electronic devices generally use a memory system having a memory device(s), that is, a data storage device(s). The data storage device is used as a main memory device or an auxiliary memory device for the portable electronic devices.

Memory systems using memory devices provide excellent stability, durability, high information access speed, and low power consumption, since the memory devices have no moving parts. Examples of memory systems having such advantages include universal serial bus (USB) memory devices, memory cards having various interfaces such as a universal flash storage (UFS), and solid state drives (SSDs).

As described in U.S. Pat. No. 9,727,308 (the entire contents of which are incorporated herein by reference), when volumes of millions of records need to be processed in a memory block within a set period of time, the performance of bulk data processing becomes an issue. Furthermore, when read operations occur at random in database processing, more time is required for one read operation, and this can impact performance.

For filtering and ordering, database storage engines heavily rely on sorting algorithms and technics. Behind one of the central database features, namely dataset records indexing, lies the sorting operation. To perform ordering, filtering, or indexing operation, a database storage engine normally a) reads raw database records from an underlying storage media and b) processes each record individually to determine a record relation relatively to others.

For input/output (I/O) performance optimization, database records are typically organized in special data structures that are mapped to SSD pages. The alignment of database table record fields to a single SSD page permits access to all record fields located within the page, eliminating a need to read multiple NAND pages in order to reconstruct a single database record.

SUMMARY

In one aspect of the present invention, a method for operating a storage device is provided. The method receives a sort command from a host. The method, in response to having received the sort command, configures the storage device for sorting by allocating at least one storage location to store data to be sorted based at least on a) an amount of the data to be sorted and b) an available storage space in a memory of the storage device. The method utilizes an upgradable sorting algorithm to generate sorted data subsets and stores the sorted data subsets based on the at least one storage location indicating where the data to be sorted is to be stored. The method provides, to the host, page identifiers (IDs) of the sorted data subsets.

In another aspect of the present invention, a system for accelerated sorting of data from a storage device is provided. The system has a host interface for communicating between a host and the storage device, a memory in the storage device for storing the data, and a reconfigurable SSD hardware accelerator processor in the storage device in communication with the memory and the host interface. The reconfigurable SSD hardware accelerator processor is configured to a) configure the storage device for optimal sorting by allocating at least one storage location for storage of data to be sorted, b) utilize an upgradable sorting algorithm to generate sorted data subsets of retrieved data from the memory, c) store the sorted data subsets based on the at least one storage location indicating where to store data to be sorted, and d) provide to the host page identifiers (IDs) of the sorted data subsets.

In another aspect of the present invention, a method for operating a storage device is provided. In this method, a host may reconfigure a SSD hardware accelerator processor sorting algorithm. The method, in response to having received a sorting algorithm update command, updates a sorting algorithm to be used for data sorting with an ordering/sorting algorithm provided as write data of the command. In this method, database records maybe stored in accordance with a database storage engine page format specified by the host in the sorting algorithm update command. In this method, before the start of the ordering/sorting operation, a data sorting accelerator may be configured with a database storage engine page format.

Additional aspects of the present invention will become apparent from the following description.

BRIEF DESCRIPTION OF THE DRAWINGS

FIG. 7 is a depiction of auxiliary metadata accompanying database record fields.

FIG. 8 is a depiction of database table compaction (reduction) into dataset formed from columns in which an ordered table and auxiliary metadata are stored.

DETAILED DESCRIPTION

Figure 1:
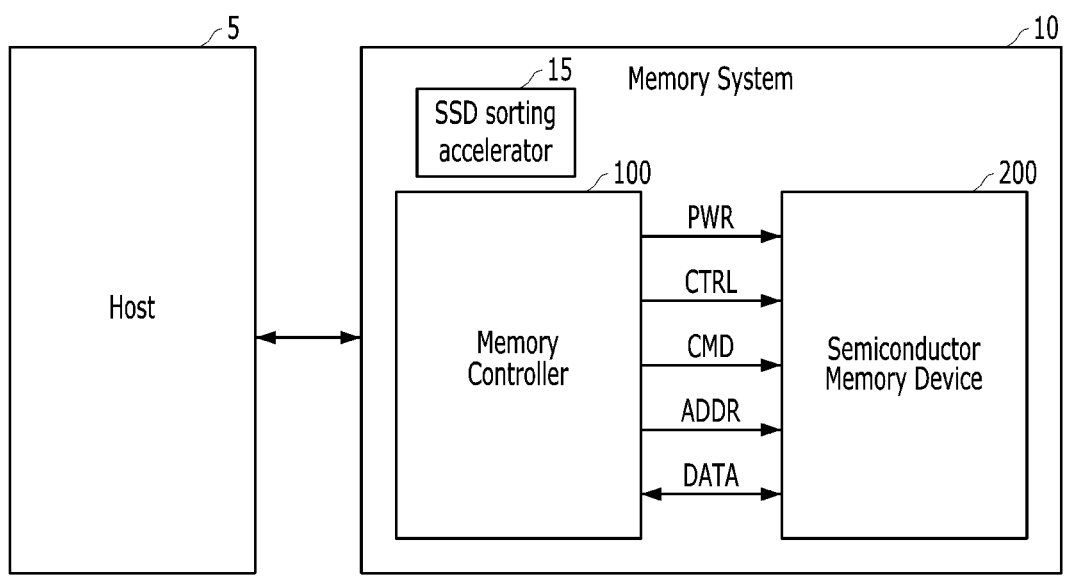
FIG. 1 is a block diagram illustrating a sorting system in accordance with one embodiment of the present invention.

Various embodiments of the present invention are described below in more detail with reference to the accompanying drawings. The present invention may, however, be embodied in different forms and thus should not be construed as limited to the embodiments set forth herein. Rather, these embodiments are provided so that this disclosure conveys the scope of the present invention to those skilled in the art. Moreover, reference herein to "an embodiment," "another embodiment," or the like is not necessarily to only one embodiment, and different references to any such phrase are not necessarily to the same embodiment(s). The term "embodiments" as used herein does not necessarily refer to all embodiments. Throughout the disclosure, like reference numerals refer to like parts in the figures and embodiments of the present invention.

The present invention can be implemented in numerous ways, including as a process; an apparatus; a system; a computer program product embodied on a computer-readable storage medium; and/or a processor, such as a processor suitable for executing instructions stored on and/or provided by a memory coupled to the processor. In this specification, these implementations, or any other form that the present invention may take, may be referred to as techniques. In general, the order of the operations of disclosed processes may be altered within the scope of the present invention. Unless stated otherwise, a component such as a processor or a memory described as being suitable for performing a task may be implemented as a general device or circuit component that is configured or otherwise programmed to perform the task at a given time or as a specific device or circuit component that is manufactured to perform the task. As used herein, the term 'processor' or the like refers to one or more devices, circuits, and/or processing cores suitable for processing data, such as computer program instructions.

The methods, processes, and/or operations described herein may be performed by code or instructions to be executed by a computer, processor, controller, or other signal processing device. The computer, processor, controller, or other signal processing device may be those described herein or in addition to the elements described herein. Because the algorithms that form the basis of the methods (or operations of the computer, processor, controller, or other signal processing device) are described herein, the code or instructions for implementing the operations of the method embodiments may transform the computer, processor, controller, or other signal processing device into a special-purpose processor for performing the methods herein.

If implemented at least partially in software, the controllers, processors, devices, modules, units, multiplexers, generators, logic, interfaces, decoders, drivers, generators and other signal generating and signal processing features may include, for example, a memory or other storage device for storing code or instructions to be executed, for example, by a computer, processor, microprocessor, controller, or other signal processing device.

A detailed description of embodiments of the present invention is provided below along with accompanying figures that illustrate aspects of the present invention. The present invention is described in connection with such embodiments, but the present invention is not limited to any specific embodiment. The present invention encompasses numerous alternatives, modifications and equivalents. Numerous specific details are set forth in the following description in order to provide a thorough understanding of the present invention. These details are provided for the purpose of example; the present invention may be practiced according to the claims without some or all of these specific details. For clarity, technical material that is known in technical fields related to the present invention has not been described in detail so that the present invention is not unnecessarily obscured.

Hardware and Firmware

FIG. 1 is a block diagram illustrating a system 2 in accordance with one embodiment of the present invention. Referring to FIG. 1, the system 2 may include a host device 5, a memory system 10, and an embedded reconfigurable SSD data sorting accelerator 15.

The present invention has been realized based on recognizing that, for timely delivery of data to a CPU from modern high-performance SSDs, the performance of a sorting algorithm may be often be limited by the lack of computational resources and RAM in the CPU. For example, database storage engine often runs on general-purpose CPUs that may not be optimized for processing a large amount of data. In addition, the database storage system computation resources are shared between users and system tasks.

As an example, to retrieve a single dataset record, at least a single database system page is read from the underlying storage. In the next step, a database system reconstructs record from raw page data. Database record reconstruction is conventionally performed on a general-purpose CPU in host 5 that is not optimized for such operations.

When a dataset (e.g., database pages) on which an ordering operation is performed cannot entirely fit into a database storage engine device memory (such as memory 508), an external sorting technic is often applied to the dataset. External sorting typically utilizes periodic data swapping between the computing device main memory (RAM) and the underlying storage memory, both in the CPU of host 5. Modern SSDs offer high IO data bandwidth and comparably low random read/write latency, making SSDs a preferred choice for database systems utilizing external sorting algorithms. Modern high-performance SSDs are able to guarantee the timely delivery of data to the CPU that executes the sorting algorithm. In this regard, the performance limitation when executing the external sorting algorithm may be caused as noted above by the lack of computational resources and RAM in the CPU.

Furthermore, during external sorting, processed data may be constantly transferred between the computation device main memory and the SSD storage device. Such constant data transfer leads to increased power consumption and increased communication interface channel utilization.

Accordingly, in one embodiment of the present invention, there is provided an embedded reconfigurable SSD hardware accelerator programmed to perform in-SSD database records sorting. In one embodiment of the present invention, the embedded reconfigurable SSD hardware accelerator offloads from the host RAM and CPU resources, thereby reducing power consumption and host interface utilization, and thereby speeding up the entire data retrieving process.

Referring back to FIG. 1, memory system 10 may receive a request from host device 5 and operate in response to the received request. For example, the memory system 10 may store data to be accessed by the host device 5. The host device 5 may be implemented with any of various types of electronic devices.

In various embodiments, the host device 5 may be an electronic device such as for example a desktop computer, a workstation, a three-dimensional (3D) television, a smart television, a digital audio recorder, a digital audio player, a digital picture recorder, a digital picture player, and/or a digital video recorder, and/or a digital video player. In various embodiments, the host device 5 may be a portable electronic device such as for example a mobile phone, a smart phone, an e-book, an MP3 player, a portable multimedia player (PMP), and/or a portable game player.

The memory system 10 may be implemented with any of various types of storage devices such as a solid state drive (SSD) and a memory card. In various embodiments, the memory system 10 may be one of various components in an electronic device such as for example a computer, an ultra-mobile personal computer (PC) (UMPC), a workstation, a net-book computer, a personal digital assistant (PDA), a portable computer, a web tablet PC, a wireless phone, a mobile phone, a smart phone, an e-book reader, a portable multimedia player (PMP), a portable game device, a navigation device, a black box, a digital camera, a digital multimedia broadcasting (DMB) player, a 3-dimensional television, a smart television, a digital audio recorder, a digital audio player, a digital picture recorder, a digital picture player, a digital video recorder, a digital video player, a storage device of a data center, a device capable of receiving and transmitting information in a wireless environment, a radio-frequency identification (RFID) device, as well as one of various electronic devices of a home network, one of various electronic devices of a computer network, one of electronic devices of a telematics network, or one of various components of a computing system.

The memory system 10 may include a memory controller 100 and a semiconductor memory device 200. The memory controller 100 may control overall operations of the semiconductor memory device 200.

The semiconductor memory device 200 may perform one or more erase, program, and read operations under the control of the memory controller 100. The semiconductor memory device 200 may receive through input/output lines a command CMD, an address ADDR, and data DATA. The semiconductor memory device 200 may receive power PWR through a power line and a control signal CTRL through a control line. The control signal CTRL may include for example a command latch enable signal, an address latch enable signal, a chip enable signal, a write enable signal, a read enable signal, as well as other operational signals depending on design and configuration of the memory system 10.

The memory controller 100 and the semiconductor memory device 200 may be a single semiconductor device such as the above-noted solid state drive (SSD). The SSD may include a storage device for storing data therein. When the semiconductor memory system 10 is used in an SSD, operation speed of a host device (e.g., host device 5 of FIG. 1) coupled to the memory system 10 may improve.

The memory controller 100 and the semiconductor memory device 200 may also be a single semiconductor device such as a memory card. For example, the memory controller 100 and the semiconductor memory device 200 may be a personal computer (PC) card of personal computer memory card international association (PCMCIA), a compact flash (CF) card, a smart media (SM) card, a memory stick, a multimedia card (MMC), a reduced-size multimedia card (RS-MMC), a micro-size version of MMC (MMCmicro), a secure digital (SD) card, a mini secure digital (miniSD) card, a micro secure digital (microSD) card, a secure digital high capacity (SDHC), and a universal flash storage (UFS).

Figure 2:
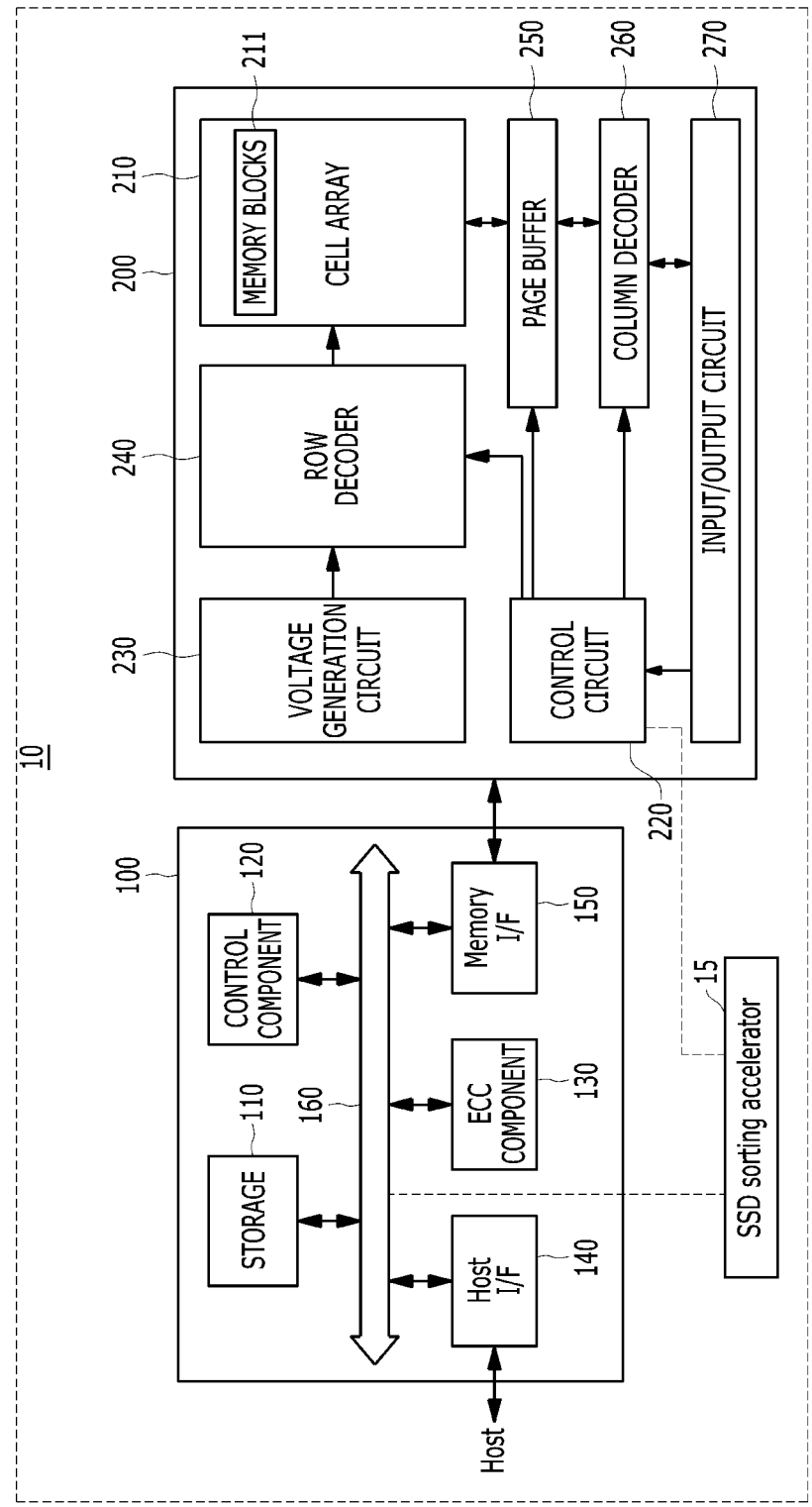
FIG. 2 is a block diagram illustrating a memory system in accordance with another embodiment of the present invention.

FIG. 2 is a block diagram illustrating a memory system in accordance with another embodiment of the present invention. For example, the memory system of FIG. 2 may depict the memory system shown in FIG. 1.

Referring to FIG. 2, the memory system 10 may include a memory controller 100 and a semiconductor memory device 200. The memory system 10 may operate in response to a request from a host device (e.g., a request from host device 5 of FIG. 1), and in particular, store data to be accessed by the host device.

The memory device 200 may store data to be accessed by the host device. The memory device 200 may be a volatile memory device such as for example a dynamic random access memory (DRAM) and/or a static random access memory (SRAM) or a non-volatile memory device such as for example a read only memory (ROM), a mask ROM (MROM), a programmable ROM (PROM), an erasable programmable ROM (EPROM), an electrically erasable programmable ROM (EEPROM), a ferroelectric random access memory (FRAM), a phase change RAM (PRAM), a magnetoresistive RAM (MRAM), and/or a resistive RAM (RRAM).

The controller 100 may control storage of data in the memory device 200. For example, the controller 100 may control the memory device 200 in response to a request from the host device. The controller 100 may provide data read from the memory device 200 to the host device, and may store data provided from the host device into the memory device 200.

The controller 100 may include a storage 110, a control component 120 which may be implemented as a processor such as for example a central processing unit (CPU), an error correction code (ECC) component 130, a host interface (I/F) 140 and a memory interface (I/F) 150, which are coupled through a bus 160. For sake of brevity, controller 100 may be considered a host interface layer (HIL)

The storage 110 may serve as a working memory of the memory system 10 and the controller 100, and storage 110 may store data for driving the memory system 10 and the controller 100. When the controller 100 controls operations of the memory device 200, the storage 110 may store data used by the controller 100 and the memory device 200 for such operations as read, write, program and erase operations.

The storage 110 may be a volatile memory such as a static random access memory (SRAM) or a dynamic random access memory (DRAM). As described above, the storage 110 may store data used by the host device in the memory device 200 for the read and write operations. To store the data, the storage 110 may include a program memory, a data memory, a write buffer, a read buffer, a map buffer, and the like.

The control component 120 may control general operations of the memory system 10, and a write operation or a read operation for the memory device 200 in response to a write request or a read request from the host device. For the sake of brevity, the control component 120 (may drive firmware or other program instructions) may be referred to as a flash translation layer (FTL), and control operations of the memory system 10. For example, the FTL may perform operations such as logical-to-physical (L2P) mapping, wear leveling, garbage collection, and/or bad block handling. The L2P mapping is known as logical block addressing (LBA).

The ECC component 130 may detect and correct errors in the data read from the memory device 200 during a read operation. In one embodiment, the ECC component 130 may not correct error bits when the number of the error bits is greater than or equal to a threshold number of correctable error bits, but instead may output an error correction fail signal indicating failure in correcting the error bits.

In various embodiments, the ECC component 130 may perform an error correction operation based on a coded modulation such as for example a low density parity check (LDPC) code, a Bose-Chaudhuri-Hocquenghem (BCH) code, a turbo code, a turbo product code (TPC), a Reed-Solomon (RS) code, a convolution code, a recursive systematic code (RSC), a trellis-coded modulation (TCM), or a Block coded modulation (BCM). However, error correction is not limited to these techniques. As such, the ECC component 130 may include any and all circuits, systems or devices suitable for error correction operation.

The host interface 140 may communicate with the host device through one or more of various communication standards or interfaces such as for example a universal serial bus (USB), a multimedia card (MMC), a peripheral component interconnect express (PCI-e or PCIe), a small computer system interface (SCSI), a serial-attached SCSI (SAS), a serial advanced technology attachment (SATA), a parallel advanced technology attachment (PATA), an enhanced small disk interface (ESDI), and an integrated drive electronics (IDE).

The memory interface 150 may provide an interface between the controller 100 and the memory device 200 to allow the controller 100 to control the memory device 200 in response to a request from the host device. The memory interface 150 may generate control signals for the memory device 200 and process data under the control of the control component 120. In one embodiment where the memory device 200 is a flash memory such as a NAND flash memory, the memory interface 150 may generate control signals for the memory and process data under the control of the control component 120.

The memory device 200 as shown for example in FIG. 2 may comprise a memory cell array 210, a control circuit 220, a voltage generation circuit 230, a row decoder 240, a page buffer 250 which may be in the form of an array of page buffers, a column decoder 260, and an input and output (input/output) circuit 270 (or SEs of these elements). The memory cell array 210 may include a plurality of memory blocks 211 which may store data. The voltage generation circuit 230, the row decoder 240, the page buffer array 250, the column decoder 260 and the input/output circuit 270 may form a peripheral circuit for the memory cell array 210. The peripheral circuit may perform program, read, or erase operations of the memory cell array 210. The control circuit 220 may control the peripheral circuit.

The voltage generation circuit 230 may generate operational voltages of various levels. For example, in an erase operation, the voltage generation circuit 230 may generate operational voltages of various levels such as an erase voltage and a pass voltage.

The row decoder 240 may be in electrical communication with the voltage generation circuit 230, and the plurality of memory blocks 211. The row decoder 240 may select at least one memory block among the plurality of memory blocks 211 in response to a row address generated by the control circuit 220, and transmit operation voltages supplied from the voltage generation circuit 230 to the selected memory blocks.

Figure 3:
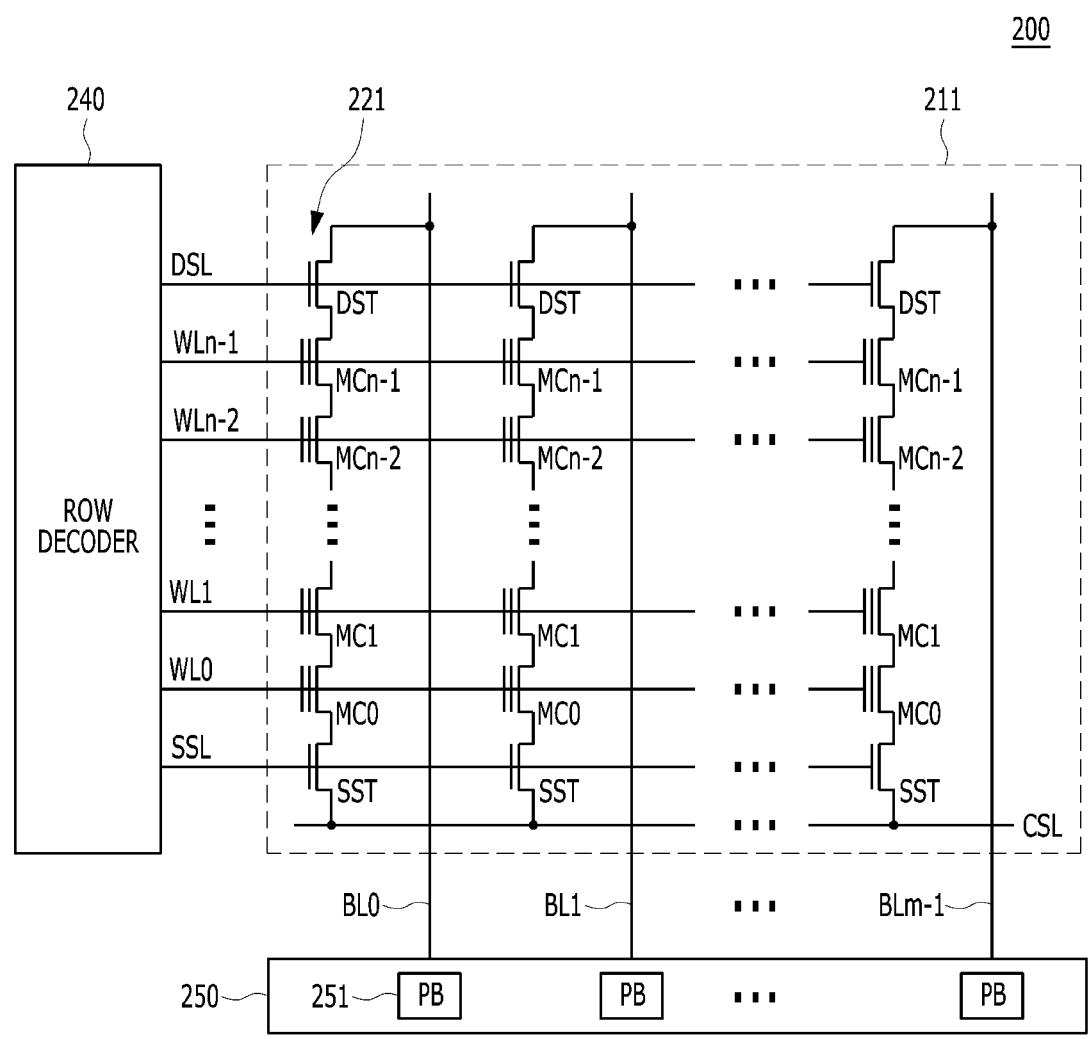
FIG. 3 is a circuit diagram illustrating a memory block of a memory device in accordance with still another embodiment of the present invention.

The page buffer 250 may be coupled with the memory cell array 210 through bit lines BL (shown in FIG. 3). The page buffer 250 may precharge the bit lines BL with a positive voltage, transmit data to and receive data from, a selected memory block in program and read operations, or temporarily store transmitted data in response to page buffer control signal(s) generated by the control circuit 220.

The column decoder 260 may transmit data to and receive data from the page buffer 250 or may transmit and receive data to and from the input/output circuit 270.

The input/output circuit 270 may transmit to the control circuit 220 a command and an address, received from an external device (e.g., the memory controller 100 of FIG. 1), transmit data from the external device to the column decoder 260, or output data from the column decoder 260 to the external device through the input/output circuit 270. The control circuit 220 may control the peripheral circuit in response to the command and the address.

FIG. 3 is a circuit diagram illustrating a memory block of a semiconductor memory device in accordance with still another embodiment of the present invention. For example, the memory block of FIG. 3 may be any of the memory blocks 211 of the memory cell array 210 shown in FIG. 2.

Referring to FIG. 3, the memory block 211 may include a plurality of word lines WL0 to WLn−1, a drain select line DSL, and a source select line SSL coupled to the row decoder 240. These lines may be arranged in parallel, with the plurality of word lines between the DSL and SSL.

The memory block 211 may further include a plurality of cell strings 221 respectively coupled to bit lines BL0 to BLm−1. The cell string of each column may include one or more drain selection transistors DST and one or more source selection transistors SST. In the illustrated embodiment, each cell string has one DST and one SST. In a cell string, a plurality of memory cells or memory cell transistors MC0 to MCn−1 may be serially coupled between the selection transistors DST and SST. Each of the memory cells may be formed as a multiple level cell. For example, each of the memory cells may be formed as a single level cell (SLC) storing 1 bit of data. Each of the memory cells may be formed as a multi-level cell (MLC) storing 2 bits of data. Each of the memory cells may be formed as a triple-level cell (TLC) storing 3 bits of data. Each of the memory cells may be formed as a quadruple-level cell (QLC) storing 4 bits of data.

The source of the SST in each cell string may be coupled to a common source line CSL, and the drain of each DST may be coupled to the corresponding bit line. Gates of the SSTs in the cell strings may be coupled to the SSL, and gates of the DSTs in the cell strings may be coupled to the DSL. Gates of the memory cells across the cell strings may be coupled to respective word lines. That is, the gates of memory cells MC0 are coupled to corresponding word line WL0, the gates of memory cells MC1 are coupled to corresponding word line WL1, etc. The group of memory cells coupled to a particular word line may be referred to as a physical page. Therefore, the number of physical pages in the memory block 211 may correspond to the number of word lines.

The page buffer array 250 may include a plurality of page buffers 251 that are coupled to the bit lines BL0 to BLm−1. The page buffers 251 may operate in response to page buffer control signals. For example, the page buffers 251 may temporarily store data received through the bit lines BL0 to BLm−1 or sense voltages or currents of the bit lines during a read or verify operation.

In various embodiments of the present invention, the memory blocks 211 may be a NAND-type flash memory cell. However, the memory blocks 211 are not limited to such cell type, but may include NOR-type flash memory cell(s). Memory cell array 210 may be implemented as a hybrid flash memory in which two or more types of memory cells are combined, or one-NAND flash memory in which a controller is embedded inside a memory chip.

Figure 4:
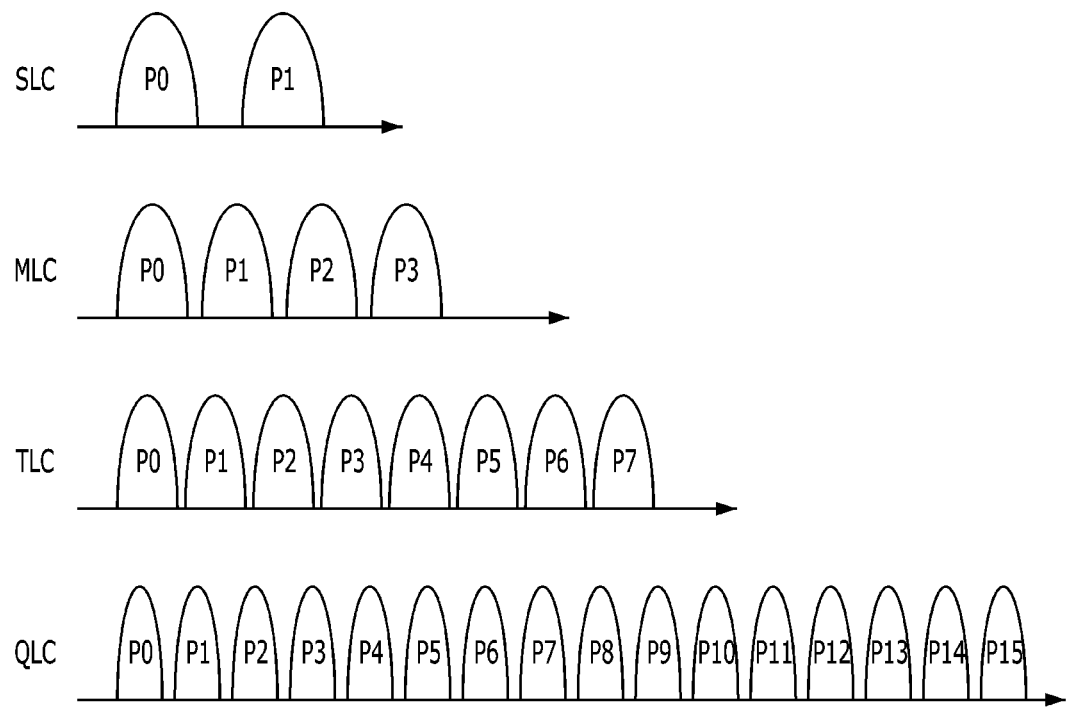
FIG. 4 is a diagram illustrating distributions of states for different types of cells of a memory device in accordance with one embodiment of the present invention.

FIG. 4 is a diagram illustrating distributions of states or program voltage (PV) levels for different types of cells of a memory device in accordance with one embodiment of the present invention.

Referring to FIG. 4, each of the memory cells may be implemented with a specific type of cell, for example, a single level cell (SLC) storing 1 bit of data, a multi-level cell (MLC) storing 2 bits of data, a triple-level cell (TLC) storing 3 bits of data, or a quadruple-level cell (QLC) storing 4 bits of data. Usually, all memory cells in a particular memory device are of the same type, but that is not a requirement.

An SLC may include two states P0 and P1. P0 may indicate an erase state, and P1 may indicate a program state. Since the SLC can be set in one of two different states, each SLC may program or store 1 bit according to a set coding method. An MLC may include four states P0, P1, P2 and P3. Among these states, P0 may indicate an erase state, and P1 to P3 may indicate program states. Since the MLC can be set in one of four different states, each MLC may program or store two bits according to a set coding method. A TLC may include eight states P0 to P7. Among these states, P0 may indicate an erase state, and P1 to P7 may indicate program states. Since the TLC can be set in one of eight different states, each TLC may program or store three bits according to a set coding method. A QLC may include 16 states P0 to P15. Among these states, P0 may indicate an erase state, and P1 to P15 may indicate program states. Since the QLC can be set in one of sixteen different states, each QLC may program or store four bits according to a set coding method.

Referring back to FIGS. 2 and 3, the memory device 200 may include a plurality of memory cells (e.g., NAND flash memory cells). The memory cells are arranged in an array of rows and columns as shown in FIG. 3. The cells in each row are connected to a word line (e.g., WL0), while the cells in each column are coupled to a bit line (e.g., BL0). These word and bit lines are used for read and write operations. During a write operation, the data to be written ('1' or '0') is provided at the bit line while the word line is asserted. During a read operation, the word line is again asserted, and the threshold voltage of each cell can then be acquired from the bit line. Multiple pages may share the memory cells that belong to (i.e., are coupled to) the same word line. When the memory cells are implemented with MLCs, the multiple pages include a most significant bit (MSB) page and a least significant bit (LSB) page. When the memory cells are implemented with TLCs, the multiple pages include an MSB page, a center significant bit (CSB) page and an LSB page. When the memory cells are implemented with QLCs, the multiple pages include an MSB page, a center most significant bit (CMSB) page, a center least significant bit (CLSB) page and an LSB page. The memory cells may be programmed for example using a coding scheme (e.g., Gray coding) in order to increase the capacity of the memory system 10 such as SSD.

In one embodiment of the present invention, a system for storage device acceleration is provided. Here, as shown in FIGS. 1 and 2, an SSD data sorting accelerator 15 is embedded in memory system 10. The SSD data sorting accelerator 15 may be in communication with control component 120 or in communication with control circuit 220. In one embodiment, the SSD data sorting accelerator 15 may be incorporated into control component 120 and/or control circuit 220.

In general, a database index is a data structure that improves the speed of data retrieval operations on a database table at the cost of additional writes and storage space to maintain the index data structure. Indexing all database columns is not always feasible or necessary. In the case where a retrieved database query result set should be ordered by one of the columns, a database storage engine may sort a result set before returning ordered data to the query originator (such as a host). The first step in the data sorting process is to store the intermediate query results into a temporal table. In the second step, the database storage engine orders temporal table records by a query "order by" parameter. The database query "order by" parameter specifies database table columns by which the result set should be ordered before being returned to user. The database storage engine returns to query originator a sorted dataset set ordered by column specified in "order by" parameter.

Commonly, database systems apply external sorting algorithm to order a query result that does not fit into the main memory. External sorting involves an interactive process of reading out a subset of database table entries from SSD to local cache memory, ordering the subset and writing ordered data to the storage media. External sort algorithm completes when all sorted subsets of data are merged into a single ordered set that represents the final query result returned to a user.

Database storage engine processes pages by loading them into the memory from the NAND. Page processing is a computation resource-intensive task that is performed typically by a general-purpose CPU.

Figure 5:
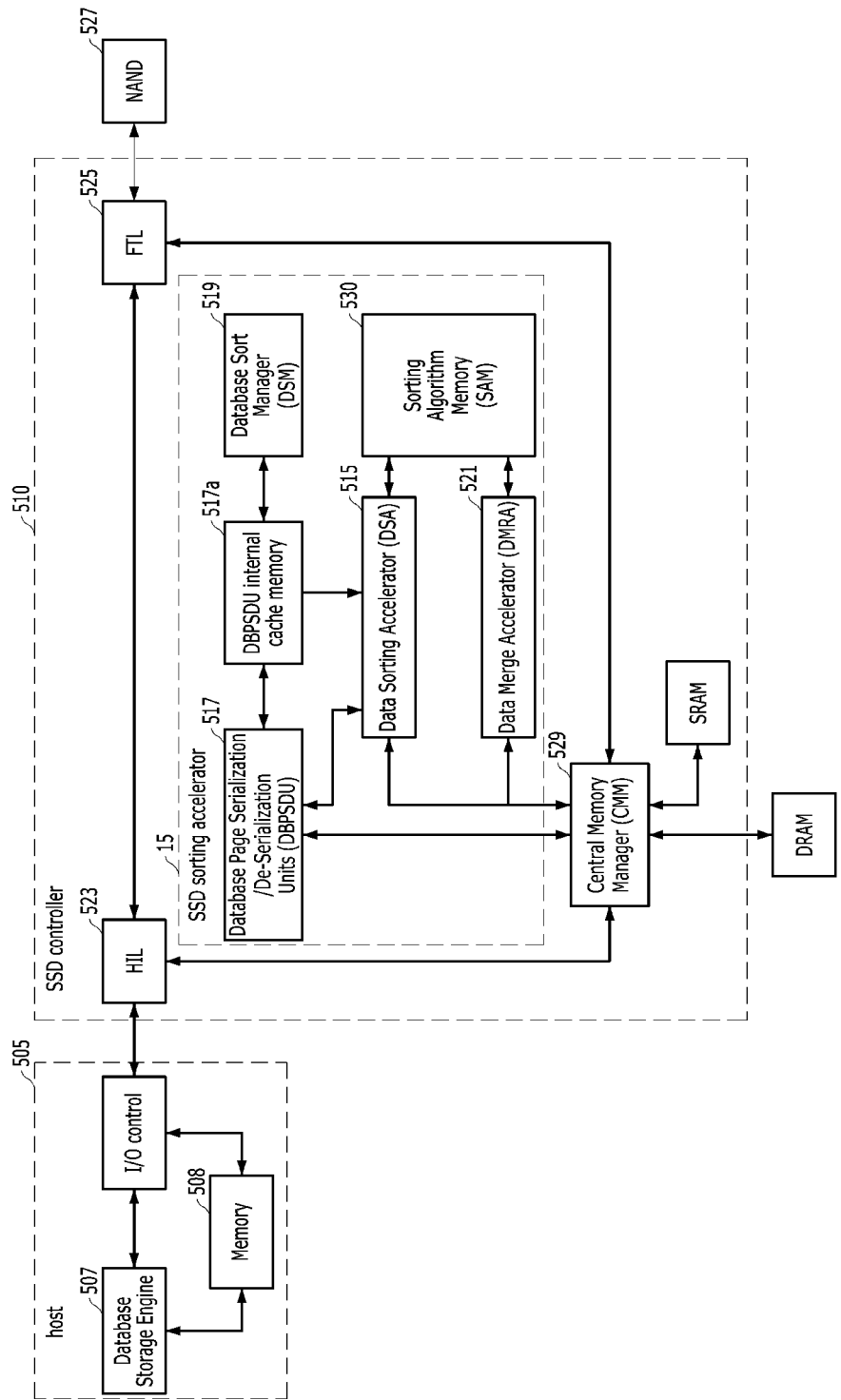
FIG. 5 is a block diagram illustrating a specific accelerated sorting system in accordance with one embodiment of the present invention.

FIG. 5 is a block diagram illustrating a specific accelerated sorting system in accordance with one embodiment of the present invention.

In reference to FIG. 5, in one embodiment of the present invention, SSD controller 510 receives sorting commands from host 505 to perform hardware accelerated sorting of database records stored in NAND pages in accordance with database storage engine page format. In one embodiment, the retrieved data from NAND may be sorted by columns specified in the sorting command. Before the start of the ordering/sorting operation, host 505 configures the SSD data sorting accelerator 15 with a database engine storage page format layout and other database specific configurations.

Upon the issuance of a SSD sort command, a database storage engine 507 in host 505 may delegate sorting operation to SSD data sorting accelerator 15, and thereafter the database storage engine 507 may continue with other operations. At the completion of the sorting operation, database storage engine 507 is notified by SSD data sorting accelerator 15 that dataset is sorted and may be retrieved.

In one embodiment of the present invention, the SSD controller 510 includes a single SSD sorting accelerator 15. In another embodiment of the present invention, the SSD controller 510 may include a large number of independent data sorting units (SSD sorting accelerators 15), permitting processing in parallel, making for higher efficiencies than with general-purpose central processing units (CPUs) especially for algorithms processing large blocks of data in parallel.

As shown in FIG. 5, SSD data sorting accelerator 15 may include a) one or more data sorting accelerator processors 515 configured to sort de-serialized data, b) one or more database page serialization de-serialization (DBPSDU processors 517 (each including DBPSDU internal cache memory 517a) configured to retrieve database pages from a memory device of the storage device and de-serialize the retrieved database pages into a data structure containing attributes defining sorting order accompanied with metadata, c) one or more database sort manager (DSM) processors 519 configured to sort the retrieved database pages based on the de-serialized database table columns utilizing upgradable sorting algorithm, d) one or more sorting algorithm memory (SAM) 530 for storage of upgradable sorting algorithm used by DSA and DMRA, and e) one or more data merge accelerator (DMRA) processors 521 configured to merge the sorted data subsets together to form the page identifiers for the sorted data subsets.

SSD host interface protocol layer (HIL) 523 is extended to support sorting logic configuration, sorting algorithm update, and to support custom SSD sorting commands (SSDSC). In one embodiment of the present invention, SSD sorting logic is configured via SSD host interface to accommodate vendor-specific commands. For example, input data distribution may influence sorting algorithm performance. Prior knowledge about input data distribution (e.g., from vendor-specific knowledge) and a corresponding sorting algorithm associated with the vendor-specific input data distribution may significantly speed up data sorting. In one embodiment of the present invention, this capability for sorting algorithm updates opens the potential for sorting performance gain(s) by employing a sorting algorithm optimized to the input data.

Upon SSD initial configuration completion, table ordering tasks can be submitted to retrieve data to be sorted from NAND. For example, after issuance of a SSD sorting command request, the SSD controller's DSM may reserve dedicated computing resources and start SSD data sorting. SSD sorting accelerator 15 is capable of intelligently selecting between SSD internal sorting methods: in memory data sorting, external NAND memory sorting, or a weighted combination of the above-noted methods. The selection of a sorting method may be conditioned by amount of available controller volatile memory for temporal storage of sorted data. The amount of controller volatile memory eligible for internal sorting depends for example on the memory occupied by other currently running SSD controller tasks. When sorted data entirely fits into available controller volatile memory, the memory sorting algorithm can be applied. This means that all data is sorted in a single pass. Because in internal (in memory) sorting when all data can be held in volatile memory, the sorting algorithm performance is much faster as compared to external sorting. For sorting a large dataset that cannot entirely fit into the available controller volatile memory. it may be necessary to hold only a chunk of the data in the controller volatile memory for sorting. Upon completing of sorting of the memory data, sorted data persisted into NAND and the next chunk of data for sorting can be loaded into memory. These described steps are repeated until all of the dataset is partially or completely sorted. The amount of memory eligible to hold data for sorting may vary in time, and in some point in time, there may be enough memory to fit all unsorted data in controller memory.

In one embodiment of the present invention, SSD internal logic (for example in database sort manage DSM 519) evaluates the amount of data to be sorted and the amount of available SSD controller volatile memory for the sorting task. Depending on the amount of available memory, DSM 519 may select an optimal sorting method for a current sorting task. Optimal sorting method may achieve faster completion of the dataset sorting under available SSD sorting accelerator computation resources and SSD controller memory utilization when a correctly used sorting algorithm configured by host is used. A detailed description of an optimal sorting method selection was described above.

In addition, the present invention in one embodiment provides for a horizontally scalable solution for throughput gain by connecting mirrored hardware accelerated database sorting SSD accelerators (in parallel) to the database storage engine system. Grouping hardware-accelerated database sorting SSDs accelerators into storage clusters permits end-users to improve database storage engine sorting performance by redirecting sorting tasks to different SSDs. Regardless, the completion of the sorting task may be manifested via transmitting a SSD sort command completion status to host 505.

As shown in FIG. 5, there is SSD memory device having a built-in SSD data sorting accelerator 15. As shown in FIG. 5, the built-in SSD data sorting accelerator 15 may have Data Sorting Accelerators (DSA) 515, sorting algorithm memory (SAM) 530, SSD Database Page Serialization/De-Serialization Units (DBPSDU) 517, Database Sort Manager (DSM) 519, Data Merge Accelerator (DMRA) 521 integrated into a data path between HIL 523 and FTL 525. Sorting algorithms may be embedded as microcode into Sorting Algorithm Memory (SAM) 530 and executed by Data Sorting Accelerator (DSA) 515.

Central memory manager (CMM) 529 is one of the SSD controller components that coordinates access to shared memory space. DSM 519 coordinates sorting tasks and makes the decision on an applied sorting method. DSA 515 performs sorting on deserialized database pages. DBPSDU 517 deserializes database storage engine pages on which sorting DSA sorting algorithm(s) will operate. Additionally, DBPSDU 517 supports data serialization into the database storage engine page storage format.

Figure 6:
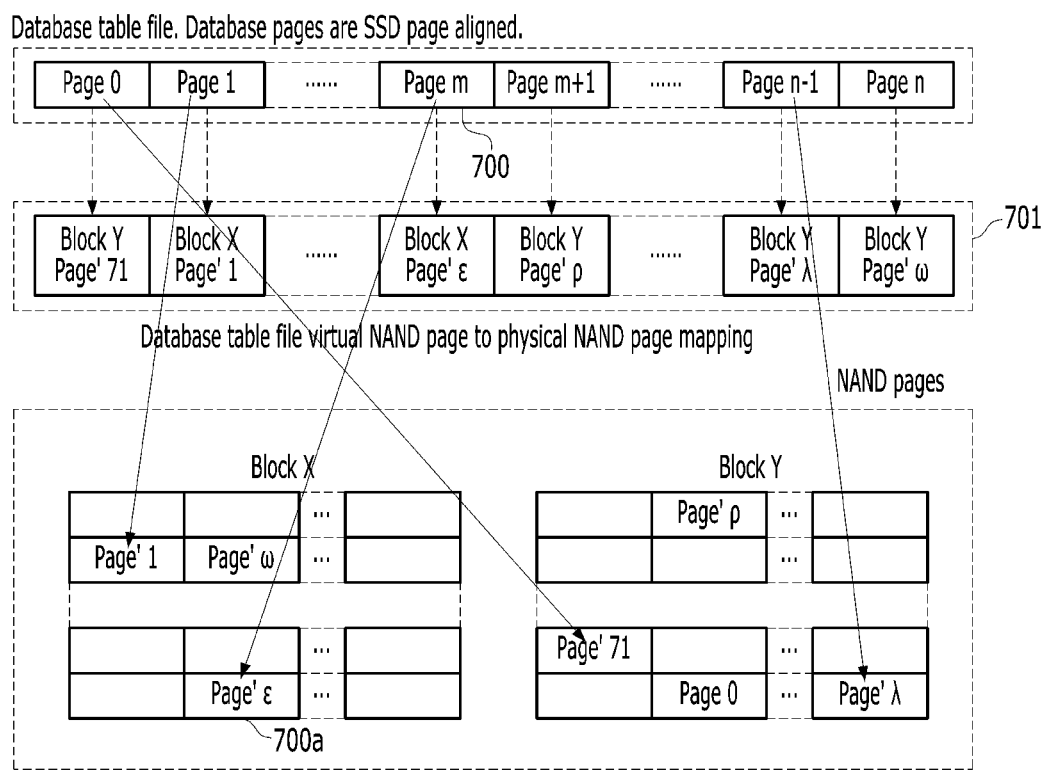
FIG. 6 is a depiction of a virtual to physical database table storage mapping scheme.

FIG. 6 is a depiction of a virtual to physical database table storage mapping scheme. The database system stores the records into files partitioned into fixed-size units called pages, illustrated in FIG. 6 as page 0, page 1, . . . page n. The database system pages are aligned in the NAND pages, a single database page may comprise from one or more NAND pages. In the FIG. 6 illustrated case, the database page completely fits into physical NAND page, i.e. database virtual page size equals to NAND page size. In FIG. 6 database page m 700 mapped through virtual to physical database page mapping table 701 to NAND page' ξ 700*a*, the size of page m 700 equal to size of NAND page' ξ 700*a*. In one embodiment of the present invention, the pages are organized in a way that minimizes storage overhead (operation and storage space) per stored data record.

Two examples of such page organization are the N-ary Storage Model (NSM) and Partition Attributes Across (PAX). U.S. Pat. No. 9,798,674 (the entire contents of which are incorporate herein by reference) describes a N-ary tree for mapping a virtual memory space. In the '674 patent, a N-ary tree (where N is a power of two (e.g., 2, 4, 8, 16, etc.) included multiple levels that each correspond to a different page table size. The '674 N-ary tree may be used in the present invention as the N-ary Storage Model. U.S. Pat. Appl. Publ. No. 2015/0347426 (the entire contents of which are incorporate herein by reference) describes a PAX data store where each page was represented a group of rows and within a block, the first column was stored first and corresponding data points stored as fields. The '426 PAX data store may be used in the present invention. DBPSDU 517 parses the NAND page according to a page format layout, deserializes records fields, and extracts fields that define sorting ordering. FIG. 7 is a depiction of auxiliary metadata accompanying database record fields. As shown in FIG. 7, de-serialized database record fields are accompanied with auxiliary metadata that uniquely identifies database record location within a database storage page.

More specifically, auxiliary metadata uniquely identifies database records within the database storage page. To identify database records within database storage page, it is enough to know a record offset within a page and its corresponding page ID. FIG. 7 depicts database table columns by which dataset records ordered and auxiliary metadata pointing to a complete dataset record within NAND pages. The database table columns defining the sorting order is a sub set of all database table columns. For table records ordering sufficient to de-serialize columns (attributes/fields) which define dataset order and perform sorting on de-serialized columns fields which accompanied with auxiliary pointer to complete table record. The process of table reduction into columns defining dataset ordering and auxiliary metadata pointing to record location within NAND pages is referred to herein as table reduction. Finally, table sorted order can be reconstructed from the auxiliary metadata of reduced sorted table by traversing sorted reduced table in the sorted order. In FIG. 7, columns $0, 1, \ldots \xi$ are columns defining the sorting order. Columns $0, 1, \ldots \xi$ is a subset of database table columns. Each de-serialized record accompanied with metadata containing the offset within the page-offset of the record within page (having for example one of database storage system page layouts such as NSM or PAX noted above). The NAND page ID (on which record n is located) is the metadata identifier that uniquely identifies the NAND page within all NAND pages.

In one embodiment of the present invention, sorted database tables are reduced to columns by which a dataset ordering is performed with auxiliary metadata containing pointer(s) to complete record location within a NAND page. Such an approach reduces NAND wear levelling by minimizing NAND program cycles during the external sorting process applied to the entire table record. In one embodiment of the present invention, sorted data is preserved at the same location during the entire sorting process, and it is a pointer to a database record that is actually sorted. In addition, because not all sorted database table records attributes are sorted in memory but only selected attributes (e.g., attributes defining sorting order), more records can fit into the SSD memory (SRAM or DRAM) for in-memory sorting and thereby reduce total sorting time by not having to store all sorted record fields in NAND 527.

In one embodiment of the present invention, a SSD host interface protocol layer is extended to support SSD sorting logic configuration, sorting algorithm update and data sorting command via the host interface protocol. SSD host protocol extension may be fulfilled by addition of vendor specific SSD sorting command, and a SSD sorting logic configuration command may be set to an already supported command set required for SSD operation. The SSD sorting command set can expand the SSD host protocol functionality to provide full control over applied sorting algorithms, configuration of a database page storage format, sorting tasks prioritization, SSD sorting logic configuration, and/or SSD sorting tasks submission. These commands may write and read the configuration DSM and DBPSDU address space.

Figure 12:
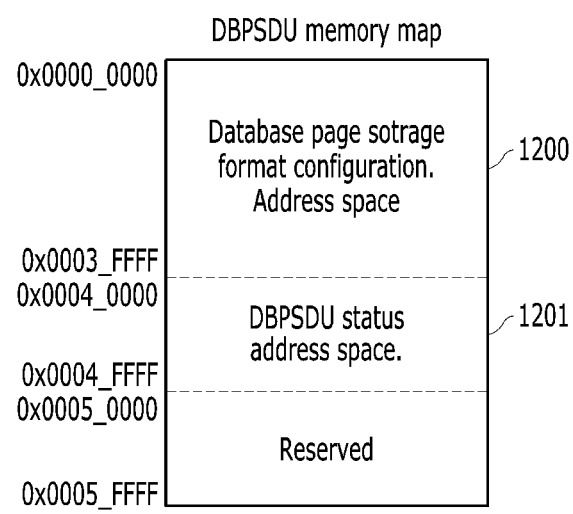
FIG. 12 is a diagram illustrating a DBPSDU memory map in accordance with still another embodiment of the present invention.

FIG. 12 is a depiction of a DBPSDU memory address map. DBPSDU memory map includes database page storage format configuration address space 1200, which is the address space used for is database page storage format configuration such as page header layout, database page size, supported database data types description, maximal number of records per page and other database page layout configuration for page serialization/de-serialization by DBPSDU. DBPSDU status address space 1201 may contain serialization/de-serialization logic operation status information on a number of currently active serialization/de-serialization threads, statistics on memory consumption by serialization/de-serialization threads, number of processed pages and correctable/un-correctable error status.

Figure 13:
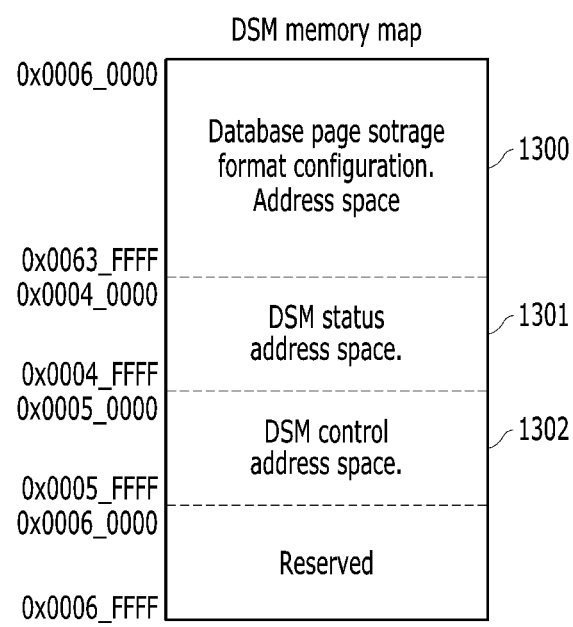
FIG. 13 is a diagram illustrating a DSM memory map in accordance with yet another embodiment of the present invention.

FIG. 13 is a depiction of a DSM memory map. Sorting algorithm microcode address space 1300 may serve as storage memory for sorting algorithm microcode, SAM 530 utilized by DSA logic and used for de-serialized data sorting. A sorting algorithm update opens the possibility to enhance sorting speed by applying a proper (more appropriate) algorithm for sorting data. DSM status page address space 1301 may contain status information on SSD sorting accelerator operation: such as for example the number of NAND pages to process, the number of sorted pages, the number of pages to merge, and the number of merged pages. DSM control address space 1302 may stores configuration on the maximal amount of SRAM and DRAM reserved for sorting and merging operation and the distribution of reserved SRAM/DRAM memory between DSA and DMRA. The database page storage format configuration space 1200 of the DSM may be configurable for SSD sorting logic according to a desired database page layout. The page storage layout may be uniform across the database storage system; therefore, the configuration space of the DSM and DBPSDU may be configured only once for a page layout. In this embodiment of the present invention, after completing an initial DSM and DBPSDU configuration, database sorting tasks can be submitted without additional DSM and DBPSDU configuration overhead.

Database table sorting task may be submitted to SSD data sorting accelerator 15 through the above-noted vendor-specific sorting command, referred to hereinafter as a SSD Sort Command (SSDSC). A SSDSC contains the following input parameters: a) column by which to order the dataset, b) a set of page IDs to execute sort upon, and c) the destination host memory address to write page IDs of the sorted database records. Upon completion of a sort command, the SSD controller's DSM notifies the host by sending the corresponding completion status command.

Figure 9A:
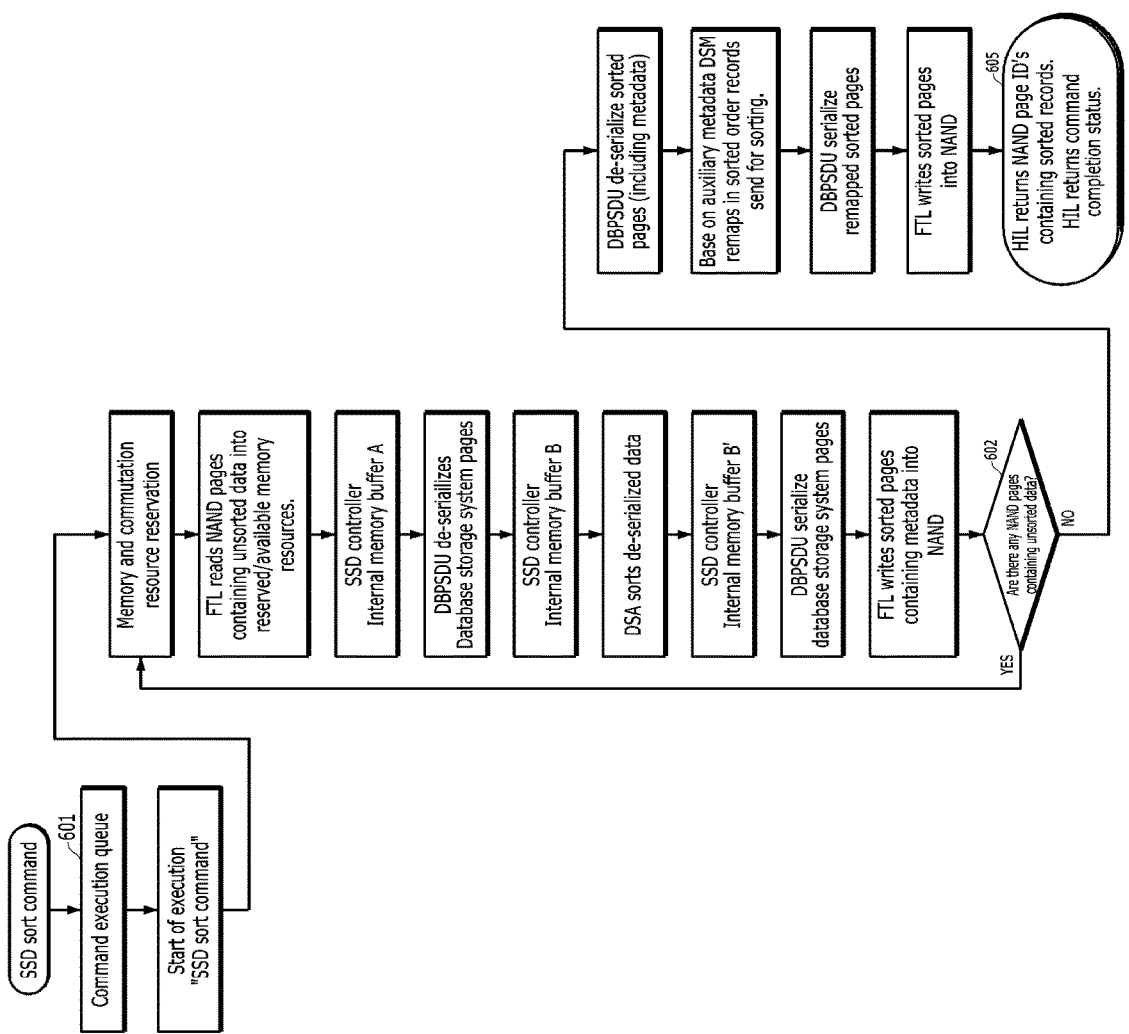
FIGS. 9A and 9B is flow diagrams in accordance with yet another embodiment of the present invention.
Figure 9B:
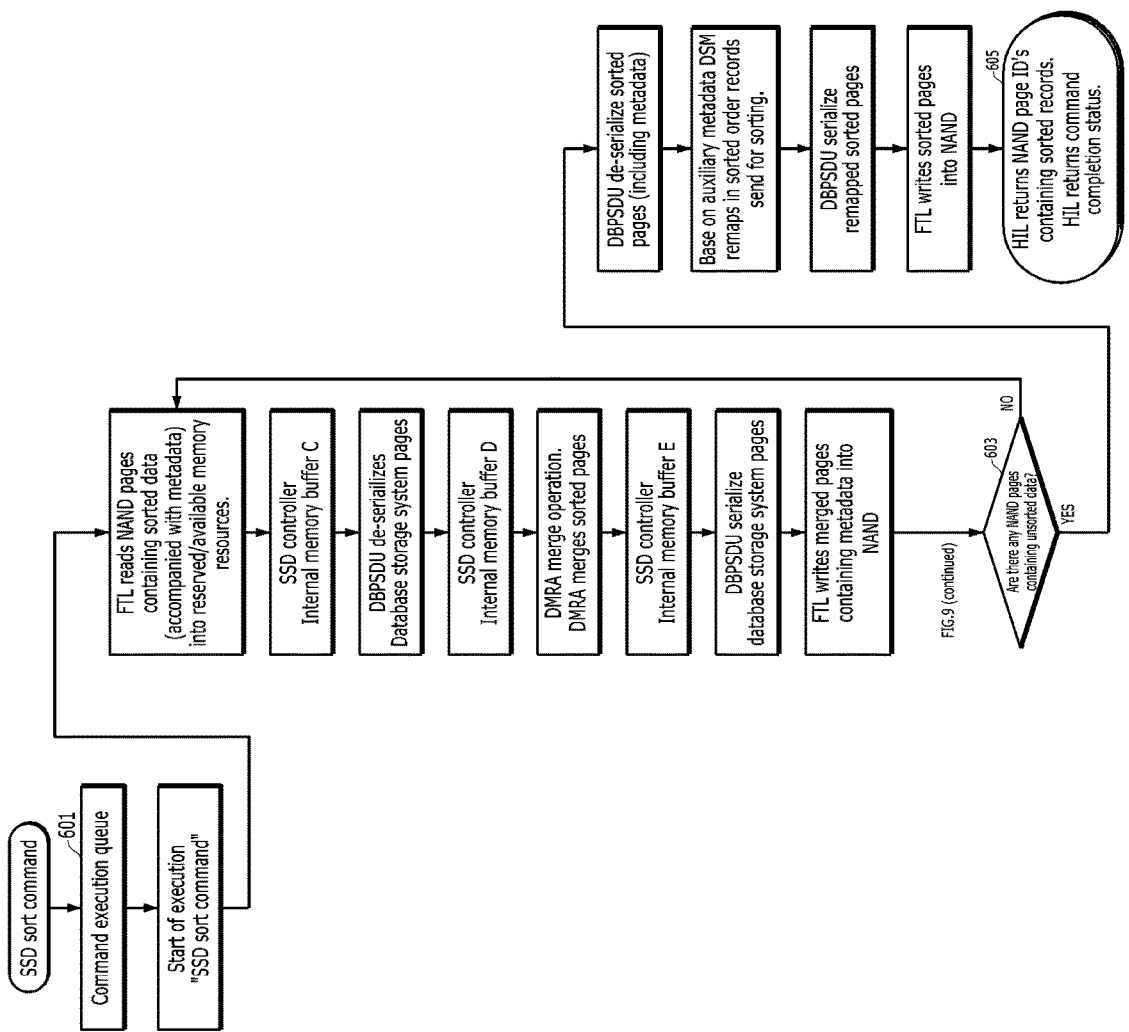

FIGS. 9A and 9B are flow diagrams in accordance with yet another embodiment of the present invention which together depict one example of a SSD sorting command execution flow. The description of the execution flow is made below with reference to FIGS. 5, 8, 9A, 9B, 12, and 13:

1. As illustrated in both FIGS. 9A and 9B, HIL 523 recognizes the internal SSD sort command and adds it to the wait execution queue 601, after which a start of execution command occurs.
2. HIL dequeues the SSD sort command from wait execution queue 601.
3. HIL notifies DSM 519 about incoming SSD sorting command.
4. DSM 519 fetches from HIL 523, NAND pages IDs to be sorted. Based on submitted sort command parameters, DSM configuration and available computation and memory resources, DSM 519 determines an optimal sorting method for sorting operation.
5. DSM 519 reserves memory, DBPSDU, DMRA, and DSA computation resources (or processors 515, 517, 521) for the upcoming sorting task execution using for example the DBPSDU memory map of FIG. 12 and the DSM memory map of FIG. 13. The amount of allocated memory to hold raw NAND pages and the number of computation resources correlate with both: the number of parallel sorting threads that can run independently and total dataset sorting time.

6. Upon resources reservation, DSM 519 notifies FTL 525 to start fetching database pages from NAND 527.
7. As described below, parallel processes "a" and "b" can be utilized (corresponding respectively to FIGS. 9A and 9B):
   a. While described with additional detail in FIG. 9A, when pages start to arrive into controller memory (SRAM or DRAM), DSA 515 is notified as to which NAND pages should be sorted.
      i. DSA 515 notifies DBPSDU 517 to read the required raw database pages and deserialize and store them into DBPSDU internal cache 517a. Records are deserialized into data structure containing attributes defining sorting order accompanied with metadata such as shown in FIG. 7 and FIG. 8.
      ii. Deserialized records are preliminary sorted in DBPSDU internal cache 517a by DSA 515.
      iii. Upon preliminary sorting completion, sorted database records are serialized and moved from internal cache 517a to SSD volatile memory such as SRAM/DRAM. Sorted data from this step will be consequently used in the merge step of the sorting algorithm.
      iv. As illustrated at branch 602 in FIG. 9A, steps in process "a" (data sorting) are repeated until all pages are sorted.
   b. While described with additional detail in FIG. 9B. DMRA 521 merges sorted data subsets in temporary volatile memory.
      i. DSM 519 supplies buffers IDs which are ready for merging to DMRA 521.
      ii. DMRA 521 reads data for merging. When merged data cannot fit into the memory space allocated for the sorting task in the SSD memory (such as SRAM/DRAM), merged output is redirected to DBPSDU 517 for serialization and further storage to NAND 527. Upon page serialization completion, DBPSDU 517 notifies DSM 519 and consequently notifies FIL 525.
         1. DSM 519 request FIL 523 to persist into NAND serialized sorted data accompanied by auxiliary metadata.
      iii. As illustrated at branch 603 in FIG. 9A, it may occur that the data merge step is executed on a sorted dataset loaded from NAND 527 that only partially fits into memory allocated for the sorting task. In this case, data is gradually transferred from NAND 527 to the SSD volatile memory, SRAM/DRAM. In one embodiment, only the amount of data that fits into allocated memory for this merge operation is transferred.
8. Described above steps "a" and "b" are repeated until unsorted data (or not merged data) is available.
9. As illustrated in both FIGS. 9A and 9B, upon merge step completion, the sorted auxiliary metadata is read from NAND. With the help of the sorted auxiliary metadata, the sorted order of the data sent to the internal SSD sorting is reproduced.
10. At 605, HIL 523 returns to the host the NAND pages IDs of the sorted data. Pages ID are returned in a proper order to preserve sorted data order.
11. As illustrated in both FIGS. 9A and 9B, at 605, upon completion of the sort command, when all pages have been processed by SSD controller 510, HIL 523 sends a command completion notification and a command completion status to the SSD sort command originator (for example the database storage engine 507).

As mentioned above, hardware accelerated database sorting SSD supports sorting algorithm update by vendor-specific command, sorting algorithm update command. SSD end-user may have different criteria for selecting sorting algorithms. For example, consideration for preferring one algorithm over another may be influenced by algorithm simplicity, runtime, memory consumption, parallel processing ability, stability, and assumption about input data. Applying a properly chosen algorithm to the input data for sorting may significantly improve sorting time.

The invention accordingly as noted above can offload host RAM and CPU resources, can reduce power consumption and host interface utilization, and speed up the entire data retrieving process.

One example of a system utilizing hardware-accelerated database sorting is provided below. In this example, the system components and attributes include:

Database search accelerated SSD with a NVMe over PCIe interface. NVM Express (NVMe) is a logical-device interface protocol for accessing a non-volatile storage media usually attached via PCI Express (PCIe) bus.

On the host side, the database storage system is coupled with an SSD controller (such as CMM 529 in SSD controller 510) via NVMe over the PCIe interface. A database storage engine (such as data base storage engine 507 in host 505) can issue the NVMe commands to SSD controller 510.

SSD support vendor-specific commands: set/get configuration attributes for DBPASDU 517, DSM 519, DMRA 521, and DSA 515.

SSD support vendor-specific command: update DSA microcode, to update DSA sorting algorithms stored in SAM 530.

SSD support vendor-specific command: SSD sort command.

The database storage system is aware of the database files mapping to the underlying SSD pages.

Figure 10:
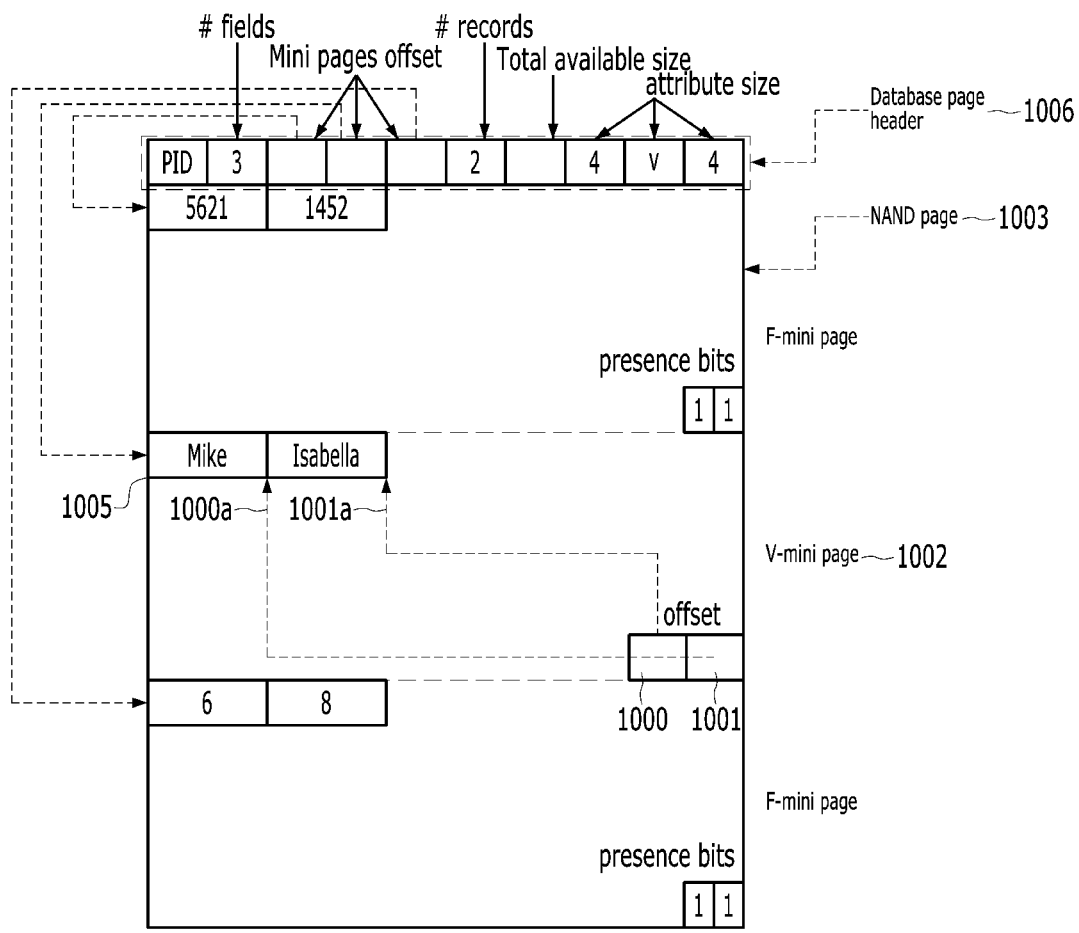
FIG. 10 is a depiction of a partition attributes across (PAX) page.

Before issuing the first SSD sorting command, the database system configures DBPASDU 517 and DSM 519 to the database page layout format to be used. The database system in this example uses a PAX page format. FIG. 10 is a depiction of one example of the format of a PAX page. The table 1004 in FIG. 10 illustrates data of an employer ID, name, and period of service which is being mapped into the PAX page in this example.

In this PAX format layout example:

Fixed-length attribute values are stored in "F mini" pages. At the end of each F mini page, there is a presence bit vector with one entry per record that denotes null values for nullable attributes. Nullable attributes may contain NULL value (no value). Present bit set to "0" denote that attribute contains null value. Present bit set to "1" denote that attribute contains value according to it type.

Variable-length attribute values are stored in "V-mini" pages. V-mini pages are slotted, with pointers to the end of each value. In FIG. 10, V mini page 1002 is slotted by offset pointers 1000 and 1001 into two variable length attributes. First attribute, that contains string value "Mike" starts from the beginning of V mini page 1002, zero offset 1005 from beginning of the min page

1002, and ends at offset 1000*a*, the offset pointed by offset pointer 1000. In other words, the first attribute is slotted by offset addresses 1005 and 1000*a*. Second attribute, that contains string value "Isabella" starts from the offset 1000*a* of V mini page 1002 and ends at offset 1001*a*, the offset pointed by offset pointer 1001. The second attributer is slotted by offset addresses 1000*a* and 1001*a*. Null values are denoted by null pointers.

Each newly allocated page contains a page header 1006, and the number of mini pages is equal to the degree of the relation. The page header contains the number of attributes, the attribute sizes (for fixed-length attributes), offsets to the beginning of the mini pages, the current number of records on the page, and the total space are still available. In this example, there are two F mini pages, one is for the employee ID attribute and one for the length of the employment attribute. The name attribute ("Mike" or "Isabella") is a variable-length string, therefore it is stored in a V mini page. At the end of each V mini page, there are offsets to the end of each variable-length value. In FIG. 10, depicted table 1004 would be mapped into NAND page 1006.

As mentioned before, DBPASDU 517 and DSM 519 are configured to deserialize PAX pages. After initialization of DBPASDU 517 and DSM 519, database sorting hardware accelerated SSD of the present invention receives and executes a sorting task. For the sake of an example, assume that a database storage system handles requests to/from a large social network database. In this example, a cluster of hardware-accelerated database sorting SSDs serves as storage device, that is a physical device that receives and retains electronic data, of database storage engine. The database in this example contains information about social network post popularity, which varies from 1 to 10, and the date of publication. A database storage engine in this example would frequently handle queries that could summarize user's posts in a given date interval, geographical location, and could order filter posts by popularity. For such types of queries, a database storage system in this example benefits from delegating ordering operation to a hardware-accelerated sorting SSD, instead of processing this operation in a CPU of the social network database storage engine. In this example, a query result set may contain about 700 million entries satisfying query search criteria. In the next step of query execution, a result set will be ordered by a hardware-accelerated database sorting SSD of the present invention.

Further, in this example, the following execution steps may be undertaken during an exemplary sorting:

Because users post popularity, order by field, value varies in an interval [1 . . . 10] sorting time will be significantly improved if a non-comparison base sorting algorithm is applied. Therefore, a database storage engine (such as data base engine 507 in host 525 issues a NVMe vendor-specific command, updates the sorting algorithm microcode in SAM 530, and updates the SAM sorting algorithm microcode with bucket sort algorithm microcode.

In the next step, the database storage engine issues a SSD sort command with all required parameters. Via the command parameters, SSD sorting logic is provided with NAND pages IDs containing data for sorting, "ordered by" column index, defining sorting order and other auxiliary configurations.

In the next steps, SSD sorting accelerator 15 operates as described in the SSD sorting command execution flow discussed above.

Upon completion of the sorting command execution, database storage engine 507 in host is given NAND pages IDs as a sorted query result set so that this data can be returned to a database query originator.

Figure 11:
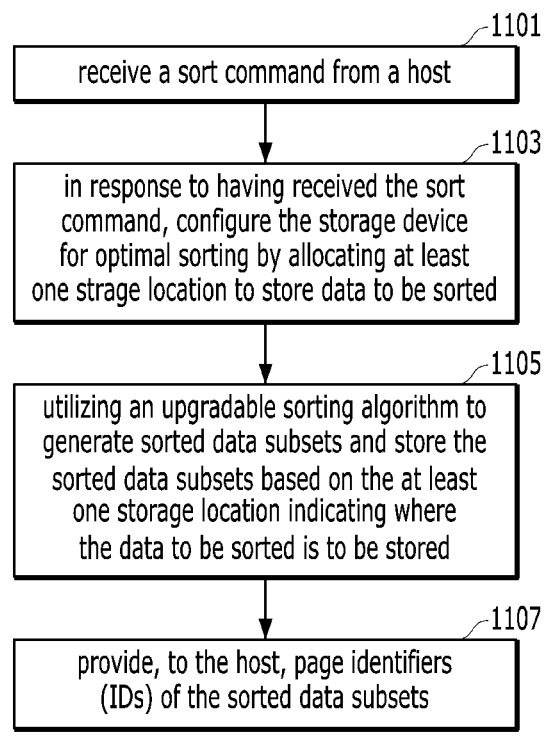
FIG. 11 is a diagram illustrating a sorting operation in accordance with another embodiment of the present invention.

FIG. 11 is a diagram illustrating a sorting operation in accordance with another embodiment of the present invention. As depicted in FIG. 11. the method at 1101 receives a sort command from a host. At 1103, in response to having received the sort command, the method configures the storage device for optimal sorting by determining at least one storage location to store data to be sorted. At 1105, the method utilizes an upgradable sorting algorithm to generate sorted data subsets and store the sorted data subsets based on the at least one storage location indicating where the data to be sorted is to be stored. At 1107, the method, provides to the host page identifiers (IDs) of the sorted data subsets.

With this method, determining the at least one storage location may be based at least on a) an amount of the data to be sorted and b) an available storage space in a memory of the storage device. This method may further retrieve database pages from the memory of the storage device, deserialize the retrieved database pages into a data structure containing attributes defining sorting order accompanied with metadata, sort the deserialized database pages based on attributes defining sorting order, save into NAND sorted serialized data subsets that do not fit into controller memory, and merge the sorted data subsets together to form the page identifiers for the sorted data subsets. This method, in response to having received a sorting algorithm update command, may update the upgradable sorting algorithm to be used for data sorting with an ordering/sorting algorithm provided as write data of the sorting algorithm update command. This method may further store retrieved database pages in a temporal storage, order deserialized database pages, serialize sorted database pages, and store serialized entries of the ordered database pages in the temporal storage. This method may further configure plural storage devices for optimal sorting and direct different sorting tasks to different plural storage devices. This method may further read database records including metadata from the storage device, process each database record individually including the metadata to determine a record relation relative to each other, and order the sorted data subsets. This method may further reserve memory for generating sorted data subsets and for storing the sorted data subsets from preceding steps. This method makes it possible to update sorting algorithm used for sorting of deserialized database pages.

This method may be executed on a storage device having a solid state drive memory buffer of the storage device, a NAND storage of the storage device, and a memory controller of the storage device, and may reserve memory in at least one of the solid state drive memory buffer, the NAND storage of the storage device, or the controller memory. This method may store some of the data for sorting to the NAND storage when the solid state drive memory buffer does not have available storage for all the data to be sorted, and this method may merge data from the solid state drive memory buffer into the NAND storage.

In one embodiment of the present invention, as shown in the figures above, a system for accelerated sorting of data from a storage device has a) a host interface for communicating between a host and the storage device, b) a memory in the storage device for storing the data; and c) a reconfigurable SSD sorting accelerator comprising a processor in the storage device in communication with the memory and the host interface, and configured to a) configure the storage device for optimal sorting by allocating at least one storage location for storage of data to be sorted, b) utilize upgradable sorting algorithm to generate sorted data subsets of retrieved data from the memory, c) store the sorted data subsets based on the at least one storage location indicating where to store the data to be sorted, and d) provide to the host page identifiers (IDs) of the sorted data subsets.

In the system for accelerated sorting of data, the reconfigurable SSD hardware accelerator may be configured to allocate the at least one storage location based at least on a) an amount of the data to be sorted and b) an available storage space in a memory of the storage device. In the system for accelerated sorting of data, the reconfigurable SSD hardware accelerator comprises one or more of a) a database page serialization processor configured to retrieve database pages from a memory device of the storage device and de-serialize the retrieved database pages into a data structure containing attributes defining sorting order accompanied with metadata, b) a data base sort manager processor configured to sort the retrieved database pages based on attributes defining sorting order, c) a data sorting accelerator processor, and d) a data merging accelerator processor configured to merge the sorted data subsets together to form the page identifiers for the sorted data subsets In the system for accelerated sorting of data, a data sorting accelerator processor and a data merging accelerator processor are configured to perform data sorting with upgradable sorting algorithm configured in algorithm sorting memory.

In the system for accelerated sorting of data, the reconfigurable SSD hardware accelerator may be configured to store the retrieved database pages in a temporal storage, order the deserialized database pages, serialize sorted database pages, and store serialized entries of the ordered database pages in the temporal storage. The reconfigurable SSD hardware accelerator may be configured direct different sorting tasks to different plural storage devices. Further, the reconfigurable SSD hardware accelerator may be configured to: read database records including metadata from the storage device, process each database record individually including the metadata to determine a record relation relative to each other, and order the sorted data subsets.

In the system for accelerated sorting of data, the reconfigurable SSD hardware accelerator may be configured to reserve memory for generating sorted data subsets and for storing the sorted data subsets. In the system for accelerated sorting of data, the storage device may be a solid state drive memory buffer of the storage device, a NAND storage of the storage device, and a controller memory of the storage device, and the reconfigurable SSD hardware accelerator may be configured to reserve memory in at least one of the solid state drive memory buffer, the NAND storage of the storage device, or the controller memory.

In the system for accelerated sorting of data, the reconfigurable SSD hardware accelerator may be configured to transmit some of the data to the NAND storage when the solid state drive memory buffer does not have available storage for all the data to be sorted. Further, the reconfigurable SSD hardware accelerator may be configured to merge data from the solid state drive memory buffer into the NAND storage.

Although the foregoing embodiments have been illustrated and described in some detail for purposes of clarity and understanding, the present invention is not limited to the details provided. There are many alternative ways of implementing the invention, as one skilled in the art will appreciate in light of the foregoing disclosure. The disclosed embodiments are thus illustrative, not restrictive. The present invention is intended to embrace all modifications and alternatives of the disclosed embodiment. Furthermore, the disclosed embodiments may be combined to form additional embodiments.

Indeed, implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations, one or more features from a combination can in some cases be excised from the combination, and the combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method for operating a solid state drive (SSD) storage device comprising:
   receiving a sort command from a host;
   in response to having received the sort command, configuring the SSD storage device for optimal sorting based on an amount of available SSD controller volatile memory for the sorting, and in response to having received the sort command, determining at least one storage location within the SSD storage device to store data to be sorted;
   utilizing in the SSD storage device a selectable upgradable sorting algorithm, selected from a plurality of algorithms, to generate sorted data subsets and storing the sorted data subsets based on the at least one storage location indicating where the data to be sorted is to be stored within the SSD storage device; and
   providing, to the host, page identifiers (IDs) of the sorted data subsets.

2. The method of claim 1, wherein the determining at least one storage location is based at least on a) an amount of the data to be sorted and b) an available storage space in a memory of the SSD storage device.

3. The method of claim 1, wherein the utilizing an upgradable sorting algorithm comprises:
   retrieving database pages from the memory of the SSD storage device;
   deserializing the retrieved database pages into a data structure containing attributes defining sorting order accompanied with metadata;
   utilizing the upgradable sorting algorithm to sort the deserialized database pages based on attributes defining sorting order; and
   merging the sorted data subsets together to form the page identifiers for the sorted data subsets.

4. The method of claim 3, further comprising:
   in response to having received a sorting algorithm update command;
   updating the upgradable sorting algorithm to be used for data sorting with an ordering algorithm provided as write data of the sorting algorithm update command.

5. The method of claim 3, further comprising:
   storing the retrieved database pages in a temporal storage, and
   ordering the deserialized database pages,
   serializing sorted database pages, and
   storing serialized entries of the ordered database pages in the temporal storage.

6. The method of claim 1, wherein the configuring the SSD storage device comprises:
   configuring plural storage devices for optimal sorting; and
   directing different sorting tasks to different plural SSD storage devices.

7. The method of claim 1, wherein the generating sorted data subsets comprises:
   reading database records including metadata from the SSD storage device;
   processing each database record individually including the metadata to determine a record relation relative to each other; and
   ordering the sorted data subsets.

8. The method of claim 1, further comprising reserving memory for generating sorted data subsets and for storing the sorted data subsets.

9. The method of claim 1, wherein
   the SSD storage device comprises a solid state drive memory buffer, a NAND storage, and a memory controller, and
   the reserving memory comprises reserving memory in at least one of the solid state drive memory buffer, the NAND storage of the storage device, or the memory controller.

10. The method of claim 9, further comprising transmitting some of the data to the NAND storage when the solid state drive memory buffer does not have available storage for all the data to be sorted.

11. The method of claim 10, further comprising merging data from the solid state drive memory buffer into the NAND storage.

12. A system for accelerated sorting of data from a solid state drive (SSD) storage device, comprising:
   a host interface for communicating between a host and the SSD storage device;
   a memory in the SSD storage device for storing the data; and
   a reconfigurable built-in SSD sorting accelerator comprising a processor in the storage device in communication with the memory and the host interface, and configured to a) configure the SSD storage device for optimal sorting based on an amount of available SSD controller volatile memory for the sorting, b) allocate at least one storage location within the SSD storage device for storage of data to be sorted, c) utilize a selectable upgradable sorting algorithm, selected from a plurality of algorithms, to generate sorted data subsets of retrieved data from the memory, d) store the sorted data subsets based on the at least one storage location within the SSD storage device indicating where to store data to be sorted, and e) provide to the host page identifiers (IDs) of the sorted data subsets.

13. The system of claim 12, wherein the reconfigurable built-in SSD sorting accelerator is configured to allocate the at least one storage location based at least on a) an amount of the data to be sorted and b) an available storage space in a memory of the SSD storage device.

14. The system of claim 12, wherein the reconfigurable built-in SSD sorting accelerator comprises one or more of a) a database page serialization processor configured to retrieve database pages from a memory device of the storage device and de-serialize the retrieved database pages into a data structure containing attributes defining sorting order accompanied with metadata, b) a data base sort manager processor configured to sort the retrieved database pages based on attributes defining sorting order with the upgradable sorting algorithm, c) a data sorting accelerator processor, and d) a data merging accelerator processor configured to merge the sorted data subsets together to form the page identifiers for the sorted data subsets.

15. The system of claim 12, wherein the reconfigurable built-in SSD sorting accelerator is configured to store the retrieved database pages in a temporal storage, order the deserialized database pages, serialize sorted database pages, and store serialized entries of the ordered database pages in the temporal storage.

16. The system of claim 12, wherein the reconfigurable built-in SSD sorting accelerator is configured direct different sorting tasks to different plural storage devices.

17. The system of claim 12, wherein the reconfigurable built-in SSD sorting accelerator is configured to:
read database records including metadata from the SSD storage device;
process each database record individually including the metadata to determine a record relation relative to each other; and
order the sorted data subsets.

18. The system of claim 12, wherein the reconfigurable built-in SSD sorting accelerator is configured to reserve memory for generating sorted data subsets and for storing the sorted data subsets.

19. The system of claim 12, wherein the SSD storage device comprises a solid state drive memory buffer, a NAND storage, and a memory controller, and
wherein the reconfigurable built-in SSD sorting accelerator is configured to reserve memory in at least one of the solid state drive memory buffer, the NAND storage of the storage device, or the memory controller.

20. The system of claim 19, wherein the reconfigurable built-in SSD sorting accelerator is configured to transmit some of the data to the NAND storage when the solid state drive memory buffer does not have available storage for all the data to be sorted.

21. The system of claim 20, wherein the reconfigurable built-in SSD sorting accelerator is configured to merge data from the solid state drive memory buffer into the NAND storage.

* * * * *